(12) United States Patent
Lim

(10) Patent No.: US 12,036,961 B2
(45) Date of Patent: Jul. 16, 2024

(54) ACTUATOR OF ELECTRIC PARKING BRAKE

(71) Applicant: HL MANDO CORPORATION, Pyeongtaek (KR)

(72) Inventor: Woochul Lim, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 427 days.

(21) Appl. No.: 17/439,867

(22) PCT Filed: Mar. 26, 2020

(86) PCT No.: PCT/KR2020/004125
§ 371 (c)(1),
(2) Date: Sep. 16, 2021

(87) PCT Pub. No.: WO2020/204466
PCT Pub. Date: Oct. 8, 2020

(65) Prior Publication Data
US 2022/0185256 A1  Jun. 16, 2022

(30) Foreign Application Priority Data

Mar. 29, 2019 (KR) .......... 10-2019-0036903

(51) Int. Cl.
*B60T 13/74* (2006.01)
*F16D 65/18* (2006.01)
(Continued)

(52) U.S. Cl.
CPC .......... *B60T 13/746* (2013.01); *F16D 65/18* (2013.01); *F16D 2121/24* (2013.01);
(Continued)

(58) Field of Classification Search
CPC .............. F16F 2125/50; F16F 2125/52; F16D 2125/50; F16D 2125/52
See application file for complete search history.

(56) References Cited

U.S. PATENT DOCUMENTS

| 2006/0054428 A1 | 3/2006 | Danne | |
| 2013/0270047 A1* | 10/2013 | Kim | F16D 65/18 |
| | | | 188/72.1 |
| 2018/0202517 A1* | 7/2018 | Jang | F16D 65/18 |

FOREIGN PATENT DOCUMENTS

| EP | 2930075 A1 * | 10/2015 | ............ B60T 13/746 |
| JP | 2015004430 A | 1/2015 | |

(Continued)

OTHER PUBLICATIONS

International Search Report dated Jul. 6, 2020.

*Primary Examiner* — Melody M Burch
(74) *Attorney, Agent, or Firm* — Harvest IP Law, LLP

(57) ABSTRACT

An actuator of an electric parking brake is disclosed. According to one embodiment of the present invention, an actuator of an electric parking brake is provided, the actuator including a driving part which generates a rotation force, a first gear part which transmits the rotation force of the driving part, a second gear part including a rotation shaft which receives the rotation force from the first gear part to rotate, and a rotation shaft control part which is disposed at one side of the second gear part on the rotation shaft, provides a degree of rotational freedom to the rotation shaft during braking, and prevents reverse rotation of the second gear part due to a reverse rotation torque by fixing the rotation shaft when the braking is completed.

10 Claims, 6 Drawing Sheets

(51) Int. Cl.
*F16D 121/24* (2012.01)
*F16D 125/50* (2012.01)
*F16D 125/52* (2012.01)
*F16D 127/06* (2012.01)

(52) U.S. Cl.
CPC ...... *F16D 2125/50* (2013.01); *F16D 2125/52* (2013.01); *F16D 2127/06* (2013.01)

(56) References Cited

FOREIGN PATENT DOCUMENTS

| | | | |
|---|---|---|---|
| KR | 20100030012 A | 3/2010 | |
| KR | 101307576 B1 * | 9/2013 | |
| KR | 101331783 B1 | 11/2013 | |
| KR | 101433755 B1 | 8/2014 | |
| KR | 101484459 B1 * | 2/2015 | |
| KR | 101701291 B1 | 2/2017 | |
| WO | WO-2017014351 A1 * | 1/2017 | ............. F16D 65/18 |

* cited by examiner

ACTUATOR OF ELECTRIC PARKING BRAKE

CROSS REFERENCE TO RELATED APPLICATIONS

This application is a National Stage of International Application No. PCT/KR2020/004125 filed Mar. 26, 2020, claiming priority based on Korean Patent Application No. 10-2019-0036903 filed Mar. 29, 2019.

TECHNICAL FIELD

The present invention relates to an actuator of an electric parking brake, and more specifically, to an actuator of an electric parking brake which electrically provides a braking force required for parking a vehicle.

BACKGROUND ART

The electric parking brake (EPB) is a brake which generates a braking force required for parking using a motor driven by electricity instead of an oil pressure. In an electric parking brake of a small vehicle such as the conventional sedan, a spindle unit is mainly employed as a conversion unit for converting a rotation force of a motor into linear movement to press a disc of a vehicle, and in an electric parking brake of a large commercial vehicle such as a truck, since a large braking force is required for parking, a ball ramp unit having efficiency higher than the spindle unit is mainly employed as a conversion unit.

Meanwhile, in the case of the small vehicle, there is no problem that a parking force is transmitted in a reverse direction so that a gear is rotated in a reverse direction after parking. However, in the case of the large commercial vehicle, there is a problem of reverse gear rotation due to a reverse rotation torque after parking, and thus, a self-locking structure for preventing the reverse gear rotation is required.

In this situation, development of an actuator of an electric parking brake, which provides a structure capable of effectively preventing reverse gear rotation due to a reverse rotation torque after parking performed by the electric parking brake, is required.

(Patent Document 1) Korean Patent Registration No. 10-1331783, "ELECTRIC CALIPER BRAKE WITH PARKING FUNCTION" announced on Nov. 21, 2013.

DISCLOSURE

Technical Problem

The present invention is directed to providing an actuator of an electric parking brake, which effectively prevents reverse gear rotation due to a reverse rotation torque after parking, in an electric parking brake.

In addition, the present invention is directed to providing an actuator of an electric parking brake in which reverse gear rotation, which is due to a reverse rotation torque after parking, is effectively prevented even by a small force of a solenoid.

Technical Solution

One aspect of the present invention provides an actuator of an electric parking brake, the actuator including a driving part which generates a rotation force, a first gear part which transmits the rotation force of the driving part, a second gear part including a rotation shaft which receives the rotation force from the first gear part to rotate, and a rotation shaft control part which is disposed at one side of the second gear part on the rotation shaft, provides a degree of rotational freedom to the rotation shaft during braking, and prevents reverse rotation of the second gear part due to a reverse rotation torque by fixing the rotation shaft when the braking is completed.

In this case, the rotation shaft control part may include a solenoid that provides the degree of rotational freedom to the rotation shaft when a current is applied to the solenoid and fixes the rotation shaft when a current is not applied to the solenoid.

The second gear part may further include an inner gear coupled to the rotation shaft, and an outer gear having a ring shape of which an inner circumferential surface is coupled to the inner gear and in which gear teeth engaged with the first gear part are formed on an outer circumferential surface of the outer gear.

An outer circumferential surface of the inner gear may be coupled to the inner circumferential surface of the outer gear.

The inner gear may include a small diameter part, which is coupled to the rotation shaft and in which gear teeth are provided on an outer circumferential surface of the small diameter part, and a large diameter part which is expanded by communicating with the small diameter part and in which gear teeth are provided on an inner circumferential surface of the large diameter part.

The actuator of the electric parking brake may further include a speed-up part which is disposed between the second gear part and the rotation shaft control part and reduces a reverse direction torque transmitted to the second gear part through the rotation shaft.

The speed-up part may include a first sun gear coupled to the rotation shaft, and a plurality of first planetary gears disposed to be engaged with the first sun gear and the inner circumferential surface of the large diameter part of the inner gear.

The actuator of the electric parking brake may further include a speed reduction part which increases the rotation torque transmitted by the second gear part.

The speed reduction part may include a plurality of second planetary gears disposed to be engaged with gear teeth provided on an outer circumferential surface of a small diameter part of the inner gear, a ring gear in which gear teeth provided on an inner circumferential surface of the ring gear are engaged with the plurality of second planetary gears and which is disposed to be fixed with respect to the rotation shaft, and a carrier coupled to the rotation shaft and rotation shafts of the plurality of second planetary gears.

Advantageous Effects

According to one embodiment of the present invention, reverse gear rotation, which is due to a reverse rotation torque after parking, can be prevented using a rotation shaft control part which prevents the reverse gear rotation due to the reverse rotation torque by providing a degree of rotational freedom to a rotation shaft during braking and fixing the rotation shaft when the braking is completed.

In addition, according to one embodiment of the present invention, the reverse gear rotation due to the reverse rotation torque can be effectively prevented using a speed-up part which reduces the reverse direction torque transmitted through the rotation shaft.

MODES OF THE INVENTION

Figure 1:
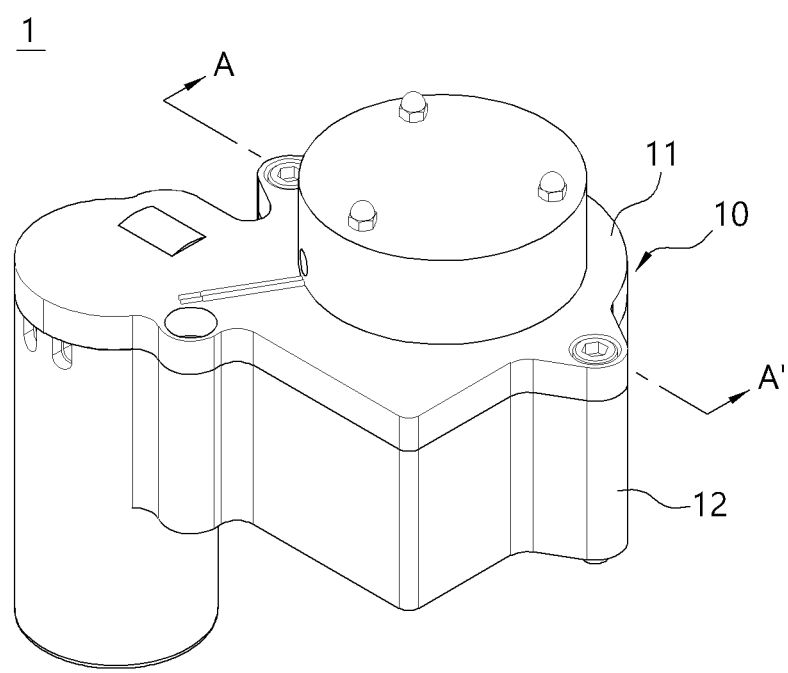
FIG. 1 is a perspective view illustrating an actuator of an electric parking brake according to one embodiment of the present invention.

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to descriptions are omitted in the drawings in order to clearly explain the present invention, and the same or similar parts are denoted by the same reference numerals throughout this specification.

It should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

FIG. 1 is a perspective view illustrating an actuator of an electric parking brake according to one embodiment of the present invention. In addition, FIG. 2 is a perspective view illustrating a state in which a housing of the actuator of the electric parking brake according to one embodiment of the present invention is removed when viewed from above, and FIG. 3 is a perspective view illustrating the state in which the housing of the actuator of the electric parking brake according to one embodiment of the present invention is removed when viewed from below.

An actuator 1 of the electric parking brake according to one embodiment of the present invention is an apparatus which is installed in a vehicle and electrically provides a braking force required for parking the vehicle. The actuator 1 the an electric parking brake according to one embodiment of the present invention provides a self-locking structure which effectively prevents reverse gear rotation due to a reverse rotation torque after braking performed by the electric parking brake. The actuator 1 of the electric parking brake according to one embodiment of the present invention may be applied to a large commercial vehicle such as a truck.

Figure 2:
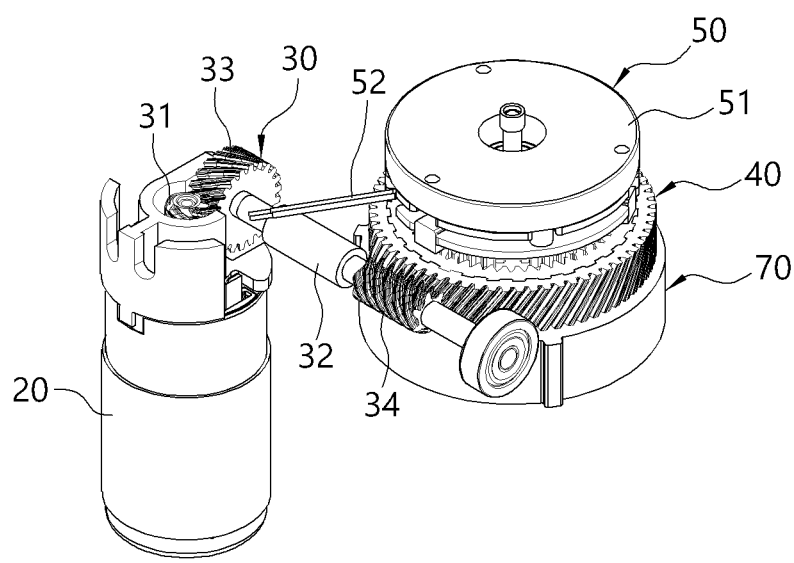
FIG. 2 is a perspective view illustrating a state in which a housing of the actuator of the electric parking brake according to one embodiment of the present invention is removed when viewed from above.
Figure 3:
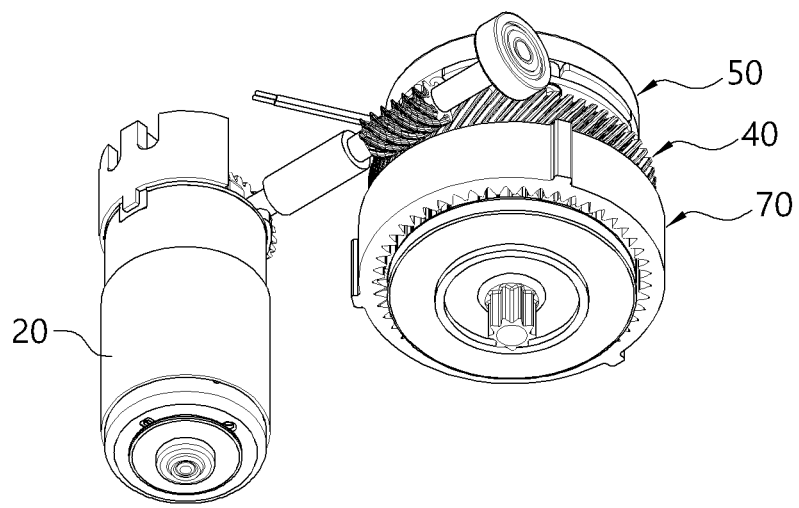
FIG. 3 is a perspective view illustrating the state in which the housing of the actuator of the electric parking brake according to one embodiment of the present invention is removed when viewed from below.

Referring to FIGS. 1 to 3, the actuator 1 of the electric parking brake according to one embodiment of the present invention may include a housing 10, a driving part 20, a first gear part 30, a second gear part 40, a rotation shaft control part 50, a speed-up part 60, and a speed reduction part 70.

The actuator 1 of the electric parking brake according to one embodiment of the present invention generates power required for a parking brake using the driving part 20 in a case in which a braking force is needed for parking the vehicle in a state in which the actuator 1 of the electric parking brake is installed in the vehicle. A rotation force generated by the driving part 20 is transmitted through the first gear part 30 and the second gear part 40. Specifically, in the actuator 1 of the electric parking brake according to one embodiment of the present invention, the second gear part 40 transmits a rotation force to a conversion unit (not shown), and the conversion unit converts the rotation force into linear movement to press a disc of the vehicle so as to generate the braking force.

In this case, the conversion unit may include various devices which convert rotation movement into linear movement. For example, the conversion unit may include a spindle unit. Meanwhile, one embodiment of the present invention may be applied to a large commercial vehicle, in which a large braking force may be transmitted as a torque in a reverse direction during parking, in order to effectively prevent reverse gear rotation due to a reverse rotation torque. In consideration of this, the conversion unit may also include a ball ramp, which is widely used in an electric parking brake of the large commercial vehicle because efficiency of the ball ramp is relatively higher than that of a spindle, when the present invention is applied.

In addition, the rotation shaft control part 50 prevents reverse rotation of the second gear part 40 due to a reverse rotation torque. The speed-up part 60 reduces a reverse direction torque transmitted to the second gear part 40 through the conversion unit, and the speed reduction part 70 increases a rotation torque transmitted to the conversion unit from the second gear part 40.

Hereinafter, the housing 10, the driving part 20, the first gear part 30, the second gear part 40, the rotation shaft control part 50, the speed-up part 60, and the speed reduction part 70 included in the actuator 1 of the electric parking brake according to one embodiment of the present invention will be described in more detail.

The housing 10 accommodates components such as the driving part 20, the first gear part 30, the second gear part 40, the rotation shaft control part 50, the speed-up part 60, and the speed reduction part 70. That is, the housing 10 provides a space in which the driving part 20, the first gear part 30, the second gear part 40, the rotation shaft control part 50, the speed-up part 60, and the speed reduction part 70 are disposed. As shown in FIG. 1, the housing 10 may include an upper housing 11 and a lower housing 12. In addition, the housing 10 may be installed in the vehicle and may also provide an interface for connecting the actuator 1 of the electric parking brake according to one embodiment of the present invention and components of the vehicle.

The driving part 20 generates a rotation force. In one embodiment of the present invention, the driving part 20 may include a motor. The driving part 20 may be controlled by an electronic control unit (ECU) of the vehicle and provides the rotation force for generating a braking force required for parking the vehicle. Accordingly, the vehicle, in which the actuator 1 of the electric parking brake according to one embodiment of the present invention is installed, may electrically generate the braking force required for parking the vehicle without complex hydraulic components.

The first gear part 30 transmits the rotation force of the driving part 20. Specifically, the first gear part 30 transmits the rotation force of the driving part 20 to the second gear part 40. In one embodiment of the present invention, the first gear part 30 may include a first worm 31 coupled to an output shaft of the driving part 20, a first worm wheel 32 engaged with the first worm 31 and rotated, a transmission shaft 33 connected to the first worm wheel 32 and rotated, and a second worm 34 disposed on the transmission shaft 33, engaged with the second gear part 40, and rotated.

The second gear part 40 receives the rotation force from the first gear part 30 and rotates. The second gear part 40 may transmit the rotation force to the conversion unit. In other words, the second gear part 40 may be connected to the conversion unit to transmit the rotation force received from the first gear part 30 to the conversion unit, and the conversion unit may convert the rotation force into linear movement to generate the braking force required for parking.

Figure 4:
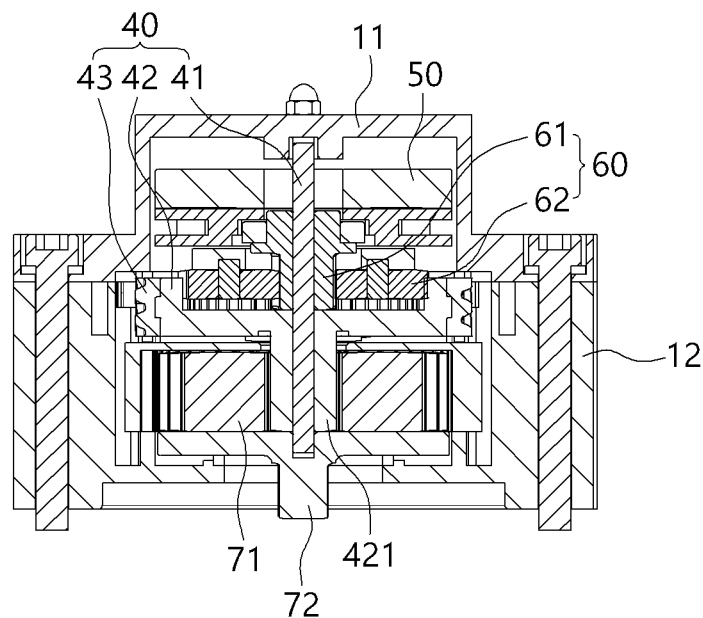
FIG. 4 is a cross-sectional view taken along line A-A' of FIG. 1.
Figure 5:
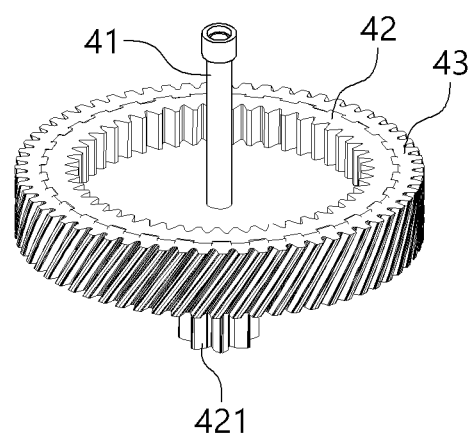
FIG. 5 is a perspective view illustrating a second gear part of the actuator of the electric parking brake according to one embodiment of the present invention.
Figure 6:
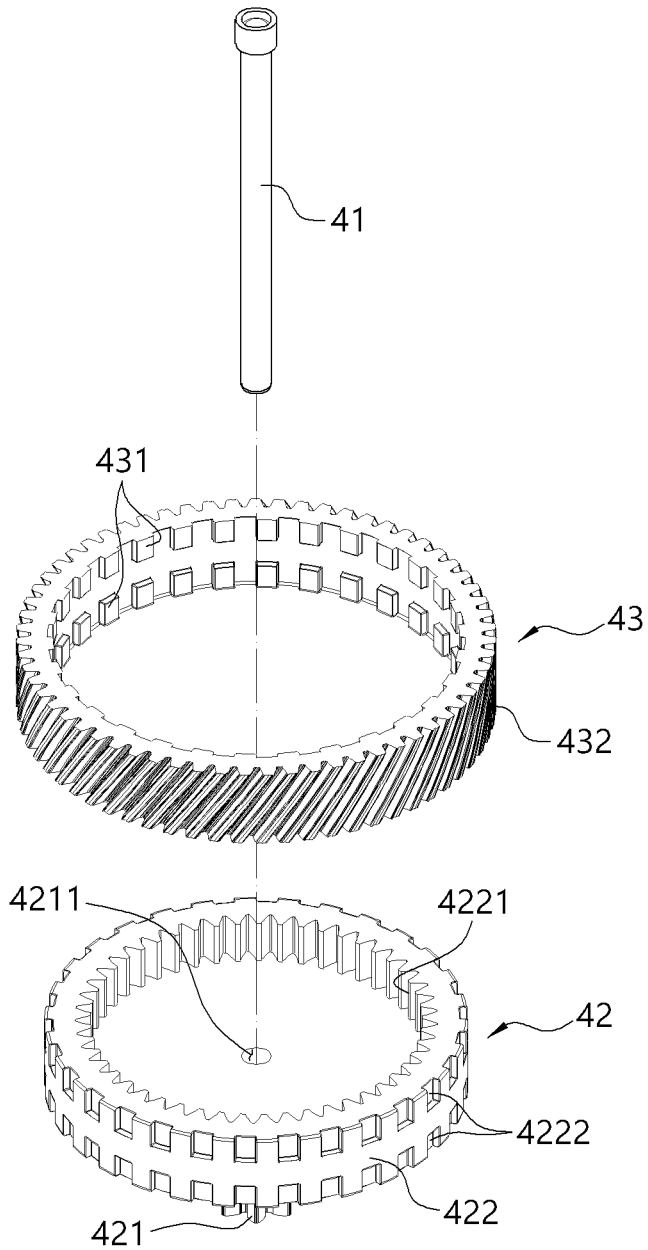
FIG. 6 is an exploded perspective view illustrating the second gear part of the actuator of the electric parking brake according to one embodiment of the present invention.

In FIG. 4, a cross-sectional view taken along line A-A' of FIG. 1 is illustrated. In FIG. 5, a perspective view of the second gear part of the actuator of the electric parking brake according to one embodiment of the present invention is illustrated, and in FIG. 6, an exploded perspective view of the second gear part of the actuator of the electric parking brake according to one embodiment of the present invention is illustrated. Referring to FIGS. 4 to 6, in one embodiment of the present invention, the second gear part 40 may include a rotation shaft 41, an inner gear 42, and an outer gear 43.

The rotation shaft 41 receives a rotation force from the inner gear 42 to rotate and transmits the rotation force to other components. The rotation shaft 41 may transmit a rotation force of the second gear part 40 to the conversion unit. In addition, the conversion unit may be disposed at one side of the second gear part 40 on the rotation shaft 41, and the rotation shaft control part 50 may be disposed at the other side of the second gear part 40 on the rotation shaft 41.

The inner gear 42 may be coupled to the rotation shaft 41 and transmits a rotation force, which is transmitted through the outer gear 43, of the first gear part 30 to the rotation shaft 41. An outer circumferential surface of the inner gear 42 may be coupled to an inner circumferential surface of the outer gear 43.

More specifically, the inner gear 42 may include a small diameter part 421 and a large diameter part 422.

The small diameter part 421 is coupled to the rotation shaft 41, and gear teeth are provided on an outer circumferential surface of the small diameter part 421. The small diameter part 421 transmits a rotation force to the rotation shaft 41. The small diameter part 421 may include a coupling hole 4211 to which the rotation shaft 41 is insertion-coupled along a center of the small diameter part 421 in a longitudinal direction, and the rotation shaft 41 is coupled to the small diameter part 421 through the coupling hole 4211 so that the rotation shaft 41 may receive the rotation force. In addition, the gear teeth provided on the outer circumferential surface of the small diameter part 421 are engaged with a plurality of second planetary gears 71 of the speed reduction part 70.

The large diameter part 422 is expanded by communicating with the small diameter part 421, and gear teeth 4221 are provided on an inner circumferential surface of the large diameter part 422. The large diameter part 422 is coupled to the outer gear 43 and transmits the rotation force, which is transmitted through the outer gear 43, to the small diameter part 421. According to one embodiment of the present invention, the gear teeth 4221 provided on the inner circumferential surface of the large diameter part 422 are engaged with a plurality of first planetary gears 62 of the speed-up part 60 which will be described below. That is, the speed-up part 60 may be disposed on the large diameter part 422 of the inner gear 42.

In addition, in one embodiment of the present invention, coupling grooves 4222 for being stably coupled with the outer gear 43 are formed in an outer circumferential surface of the large diameter part 422. Specifically, the coupling grooves 4222 are formed along the outer circumferential surface of the large diameter part 422 to be recessed and spaced apart from each other and may be formed at one side and the other side in the longitudinal direction in the outer circumferential surface of the large diameter part 422 to be parallel to each other.

The outer gear 43 may be formed as a gear having a ring shape in which the inner circumferential surface of the outer gear 43 is coupled to the inner gear 42, and gear teeth 432 engaged with the first gear part 30 are provided on an outer circumferential surface of the outer gear 43. As the gear teeth 432 formed on the outer circumferential surface of the outer gear 43 are engaged with the second worm 34 of the first gear part 30, the outer gear 43 receives a rotation force of the first gear part 30.

The outer gear 43 may include coupling protrusions 431 on the inner circumferential surface of the outer gear 43. The coupling protrusion 431 is formed to correspond to the coupling groove 4222 formed in the outer circumferential surface of the large diameter part 422 of the inner gear 42 and allows the outer gear 43 and the inner gear 42 to be stably coupled. In one embodiment of the present invention, the inner gear 42 and the outer gear 43 may be integrally formed in an insertion-injection manner or the like, and in this case, the coupling groove 4222 of the inner gear 42 and the coupling protrusion 431 of the outer gear 43 help stable coupling of the inner gear 42 and the outer gear 43.

The rotation shaft control part 50 is disposed at one side of the second gear part 40 on the rotation shaft 41, provides a degree of rotational freedom to the rotation shaft 41 during braking, and prevents reverse rotation of the second gear part 40 due to a reverse rotation torque by fixing the rotation shaft 41 when braking is completed.

Specifically, the rotation shaft control part 50 may include a solenoid 51 which provides a degree of rotational freedom to the rotation shaft 41 when a current is applied and fixes the rotation shaft 41 when a current is not applied. In addition, as shown in FIG. 2, the rotation shaft control part 50 may further include a wire 52 to apply a current to the solenoid 51.

Figure 7:
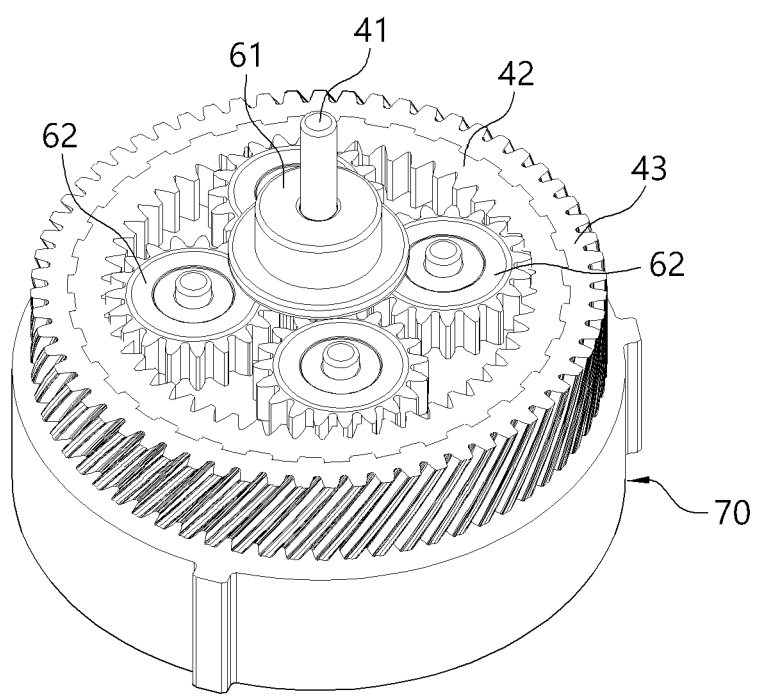
FIG. 7 is a perspective view illustrating a speed-up part of the actuator of the electric parking brake according to one embodiment of the present invention.

The speed-up part 60 is disposed between the second gear part 40 and the rotation shaft control part 50 and reduces a reverse direction torque transmitted to the second gear part 40 through the rotation shaft 41. In FIG. 7, a perspective view of the speed-up part of the actuator of the electric parking brake according to one embodiment of the present invention is shown, and referring to FIG. 7, the speed-up part 60 may include a first sun gear 61 and the plurality of first planetary gears 62.

The first sun gear 61 is coupled to the rotation shaft 41 and transmits a rotation force of the rotation shaft 41 to the plurality of first planetary gears 62 engaged with the first sun gear 61. In addition, in one embodiment of the present invention, the plurality of first planetary gears 62 are disposed to be engaged with the gear teeth 4221 provided on the inner circumferential surface of the large diameter part 422 of the inner gear 42 to reduce the rotation force transmitted to the inner gear 42 through the rotation shaft 41 and the first sun gear 61.

As described above, according to one embodiment of the present invention, since a reverse direction torque, which may be transmitted to the second gear part 40 through the conversion unit and the rotation shaft 41 after parking, may be reduced by the speed-up part 60, locking burden of the rotation shaft 41 due to the rotation shaft control part 50 may be reduced, and reverse rotation of the second gear part 40 may be effectively prevented at the same time. That is, reverse gear rotation can be efficiently prevented by the speed-up part 60 using a small force, which may be generated by the solenoid 51, of the rotation shaft control part 50.

The speed reduction part 70 increases a rotation torque transmitted by the second gear part 40. The speed reduction part 70 increases a rotation force generated by the driving part 20 and transmitted to the conversion unit through the first gear part 30 and the second gear part 40 to allow a sufficient force to be transmitted to the conversion unit during parking.

Figure 8:
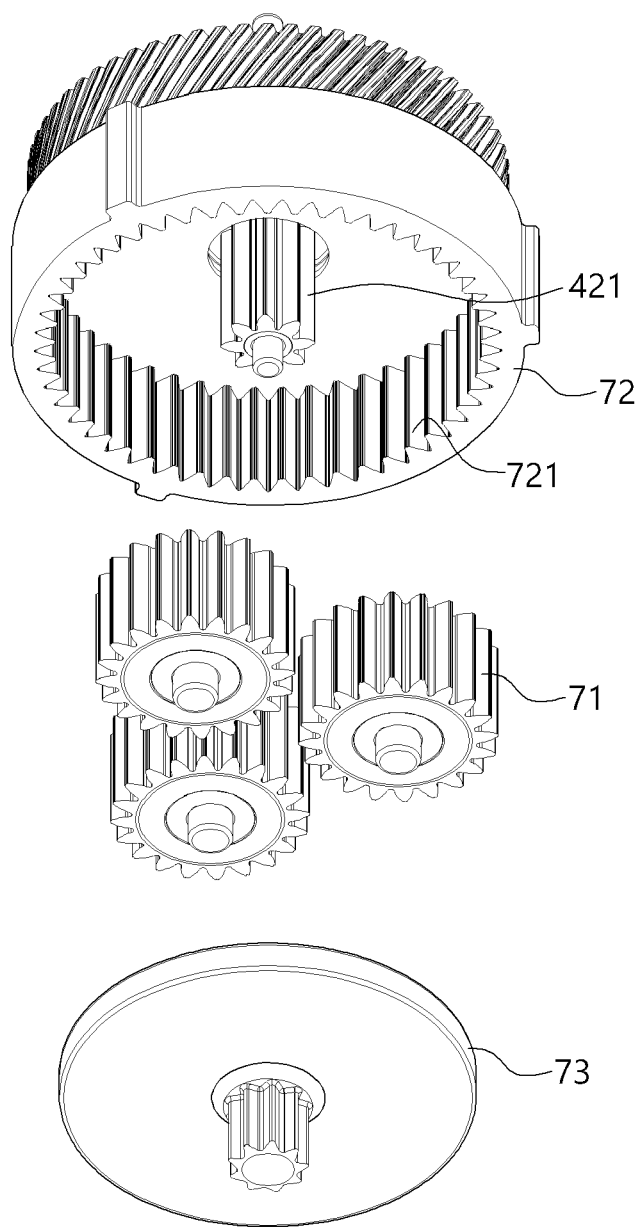
FIG. 8 is an exploded perspective view illustrating a speed reduction part of the actuator of the electric parking brake according to one embodiment of the present invention.

In FIG. 8, an exploded perspective view of the speed reduction part of the actuator of the electric parking brake according to one embodiment of the present invention is illustrated, and referring to FIG. 8, the speed reduction part 70 may include the plurality of second planetary gears 71 disposed to be engaged with the gear teeth provided on the outer circumferential surface of the small diameter part 421 of the inner gear 42, a ring gear 72 in which gear teeth 721 disposed on an inner circumferential surface of the ring gear 72 are engaged with the plurality of second planetary gears 71 and which is disposed to be fixed with respect to the rotation shaft 41, and a carrier 73 coupled to the rotation shaft 41 and rotation shafts of the plurality of second planetary gears 71.

In this case, the small diameter part 421 of the inner gear 42 serves as a sun gear with respect to the plurality of second planetary gears 71. That is, the plurality of second planetary gears 71 are engaged with the small diameter part 421 of the inner gear 42 and rotated.

In addition, the ring gear 72 may include protruding parts 722 formed on an outer circumferential surface of the ring gear 72 in the longitudinal direction. As the protruding parts 722 are inserted into grooves formed in the housing 12 to correspond to the protruding parts 722, the ring gear 72 may be disposed to be fixed with respect to the rotation shaft 41.

The carrier 73 is coupled to the rotation shaft 41 and the rotation shafts of the plurality of second planetary gears 71 and rotated to output an amplified rotation force. The carrier 73 may output the amplified rotation force to the conversion unit.

While the embodiments of the present invention have been described above, the spirit of the present invention is not limited to the embodiments proposed in this specification, and other embodiments may be easily suggested by adding, changing, and deleting components by those skilled in the art and will fall within the spiritual range of the present invention.

The invention claimed is:

1. An actuator of an electric parking brake, comprising:
a driving part which generates a rotation force;
a first gear part which transmits the rotation force of the driving part;
a second gear part including a rotation shaft which receives the rotation force from the first gear part to rotate; and
a rotation shaft control part which is disposed at one side of the second gear part on the rotation shaft, provides a degree of rotational freedom to the rotation shaft during braking, and prevents reverse rotation of the second gear part due to a reverse rotation torque by fixing the rotation shaft when the braking is completed,
wherein the second gear part further includes:
an inner gear coupled to the rotation shaft; and
an outer gear having a ring shape of which an inner circumferential surface is coupled to the inner gear and in which gear teeth engaged with the first gear part are formed on an outer circumferential surface of the outer gear,
wherein the inner gear includes:
a small diameter part which is coupled to the rotation shaft and in which gear teeth are provided on an outer circumferential surface of the small diameter part; and
a large diameter part which is expanded by communicating with the small diameter part and in which gear teeth are provided on an inner circumferential surface of the large diameter part.

2. The actuator of claim 1, wherein the rotation shaft control part includes a solenoid that provides the degree of rotational freedom to the rotation shaft when a current is applied to the solenoid and fixes the rotation shaft when a current is not applied to the solenoid.

3. The actuator of claim 1, wherein an outer circumferential surface of the inner gear is coupled to the inner circumferential surface of the outer gear.

4. The actuator of claim 1, further comprising a speed-up part which is disposed between the second gear part and the rotation shaft control part and reduces a reverse direction torque transmitted to the second gear part through the rotation shaft.

5. The actuator of claim 4, wherein the speed-up part includes:
a first sun gear coupled to the rotation shaft; and
a plurality of planetary gears disposed to be engaged with the first sun gear and the inner circumferential surface of the large diameter part of the inner gear.

6. The actuator of claim 1, further comprising a speed reduction part which increases the rotation torque transmitted by the second gear part.

7. The actuator of claim 6, wherein the speed reduction part includes:
a plurality of planetary gears disposed to be engaged with gear teeth provided on an outer circumferential surface of a small diameter part of the inner gear;
a ring gear in which gear teeth provided on an inner circumferential surface of the ring gear are engaged with the plurality of planetary gears and which is disposed to be fixed with respect to the rotation shaft; and
a carrier coupled to the rotation shaft and rotation shafts of the plurality of planetary gears.

8. The actuator of claim 7, further comprising a housing accommodating the driving part, the first gear part, the second gear part, the rotation shaft control part, and the speed reduction part,
wherein the ring gear includes a protruding part formed on an outer circumferential surface of the ring gear and extending in a longitudinal direction.

9. The actuator of claim 8, wherein the protruding part is inserted into a groove formed in the housing to correspond to the protruding part, such that the ring gear is fixed with respect to the rotation shaft.

10. The actuator of claim 1,
wherein the first gear part includes a first worm coupled to an output shaft of the driving part, a first worm wheel engaged with the first worm, a transmission shaft connected to the first worm wheel, and a second worm disposed on the transmission shaft engaged with the second gear part.

\* \* \* \* \*